United States Patent [19]

Wojciechowski et al.

[11] 4,331,693

[45] May 25, 1982

[54] METHOD FOR STORAGE OF HORTICULTURAL PRODUCTS IN FRESHNESS

[75] Inventors: Jerzy Wojciechowski, Kędzierzyn; Jerzy Haber, Cracow; Zygmunt Gozdziewicz, Kędzierzyn; Edward Lange, Skierniewice, all of Poland

[73] Assignee: Polska Akademia Nauk, Instytut Katalizy i Fizykochemii Powierzchni, Cracow, Poland

[21] Appl. No.: 184,611

[22] Filed: Sep. 8, 1980

[30] Foreign Application Priority Data

Sep. 12, 1979 [PL] Poland .................................. 218257

[51] Int. Cl.³ .................. A23B 7/14; A23B 7/148; B01J 23/56
[52] U.S. Cl. ................ 426/419; 252/466 PT; 422/4; 422/40
[58] Field of Search ............. 426/418, 419, 312; 423/245 S; 252/466 PT; 422/40, 4

[56] References Cited

U.S. PATENT DOCUMENTS

| | | | |
|---|---|---|---|
| 2,611,749 | 9/1952 | Haensel | 252/466 PT |
| 2,776,264 | 1/1957 | Dinwiddie et al. | 252/466 PT |
| 2,802,794 | 8/1957 | Sprauer | 252/466 PT |
| 2,818,393 | 12/1957 | LeFrancois | 252/466 PT |
| 2,840,532 | 6/1958 | Haensel | 252/466 PT |
| 2,852,474 | 9/1958 | Arundale et al. | 252/466 PT |
| 3,313,630 | 4/1967 | Harvey | 426/419 |
| 3,313,631 | 4/1967 | Jensen | 426/419 |
| 3,333,967 | 8/1967 | Burg | 426/419 |
| 3,958,028 | 5/1976 | Burg | 426/419 |
| 3,994,831 | 11/1976 | Betz | 423/245 S |
| 4,093,703 | 6/1978 | Buechner et al. | 423/245 S |
| 4,170,629 | 10/1979 | Betz | 423/245 S |
| 4,234,460 | 11/1980 | Nishimura et al. | 426/419 |

FOREIGN PATENT DOCUMENTS

| | | |
|---|---|---|
| 1241689 | 11/1967 | Fed. Rep. of Germany . |
| 1692187 | 10/1974 | Fed. Rep. of Germany . |
| 2528870 | 8/1976 | Fed. Rep. of Germany . |
| 120348 | 6/1976 | German Democratic Rep. . |

OTHER PUBLICATIONS

Patent Abstracts 3203771, 3102778, 3102780, 3102779, 3205049.

Primary Examiner—Steven L. Weinstein
Attorney, Agent, or Firm—Michael N. Meller; Anthony H. Handal

[57] ABSTRACT

There is provided a method for preservation of horticultural products in freshness by circulation of the atmosphere surrounding these products and removal of ethylene from it on the outside of the storage chambers, consisting in removing ethylene by catalytic combustion. Combustion of ethylene is carried out advantageously in the presence of platinum catalyst, obtained by impregnation of active aluminum oxide of specific surface area of about 200 m²/g with a 0.05–0.5% solution of chloroplatinic acid followed by drying and heating in the stream of air at the temperature up to 550° C. Ethylene combustion is carried out advantageously in the presence of platinum catalyst additionally activated by impregnation with oleic acid at the temperature of 60°–80° C., slow heating in the stream of nitrogen up to the temperature of 400°–450° C. for 2 hrs, followed by heating in the stream of air at the temperature 500°–550° C.

7 Claims, No Drawings

METHOD FOR STORAGE OF HORTICULTURAL PRODUCTS IN FRESHNESS

The invention relates to a method of storage of horticultural products in freshness by removal of ethylene from storage chambers.

Long storage of horticultural products with their preservation in the condition of freshness requires application of special operations aimed at reduction of both respiration of these products and rate of water evaporation from them.

The known methods of preservative storage of fruits and vegetables comprise e.g. deposition of appropriate coats on their surface. The East German Pat. No. 201416 reports for example treatment of the stored products with water emulsion of modified polyethylene wax with dispersion agents and agents for blocking growth of bacteria. The water emulsion is deposited on products by their immersion in the solution or by spraying.

What is widely applied is also a method of storing fruits and vegetables at reduced temperature 0°-3° C. and/or in controlled atmosphere, advantageously containing 3-5 vol.% of oxygen and several to 20 vol.% of $CO_2$.

Formation of favourable conditions for storage of horticultural products aims at considerable slowing-down of their vital functions. As a result of even considerably slowed-down respiration of the stored products, however, they undergo gradually certain changes which lead to evolution of volatile organic products, particularly of ethylene.

Presence of ethylene in surrounding of fruits or vegetables is, however, disadvantageous, since it is known that this compound accelerates ripening and hence shortens time of storage of the products. This fact has been confirmed in many experiments which showed that the removing of ethylene from environment of fruits prolonged time of their conservation. Ethylene content in air during storing of horticultural products may increase even to several thousands ppm. As the ethylene content is reduced the time of preservation of the products in the condition of freshness is increased, maximal prolongation of this time being obtained at ethylene content below 10 ppm.

Taking the above given facts into account a number of technological methods for removal of ethylene from the atmosphere surrounding the stored vegetal products have been elaborated. Such methods include for instance hypobaric storage i.e. storage under reduced pressure, preserving at the same time ventillation. During hypobaric storage ethylene is constantly removed from the surrounding atmosphere, and therefore it cannot be accumulated in the amount which could initiate ripening of vegetal products.

This method of storage is very expensive on a large scale, since it requires construction of chambers resistant to high pressure exerted from inside and resulting from the large pressure difference between atmospheric pressure and the pressure inside the chambers. High costs of construction and special construction requirements are the reasons for small practical use of this method.

There is known also a method for removing of ethylene from the atmosphere surrounding the stored products by absorption or adsorption. For instance this atmosphere is circulated through bubblers with potassium permanganate, potassium acid carbonate or with active carbon and turned back to the storage chamber. These methods are not, however, satisfactory, since not only ethylene but also other volatile substances including $CO_2$ are adsorbed. For storing purposes relatively high content of $CO_2$, amounting to even 20 vol.%, is advantageous though. Non-selective adsorption causes then that composition of air turned back to the storage chambers is inappropriate.

Irrespectively of the above shown disadvantages, the degree of ethylene removal by adsorption is not sufficient. Ethylene content can be reduced with this method to several hundreds ppm, and only with the use of very fresh adsorption solutions /which decompose fast/ to several tens ppm.

It has been found that the above given disadvantages can be avoided if the removal of ethylene from the atmosphere surrounding the stored horticultural products is carried out by catalytic combustion of this gas to $CO_2$ and $H_2O$.

The method according to the invention consists in maintaining atmosphere which surrounds horticultutal products in circulation, ethylene being removed on the outside of the storage chamber through conveying of the gas through heated catalytic bed and turning the gas back after cooling to the chamber.

As catalysts for ethylene combustion the known total oxidation catalysts can be used, for instance copper-zinc, nickel-, cobalt- and particularly platinum catalysts.

In view of the high degree of dilution of ethylene in the gas circulating between the storage chamber or chambers and the reactor with a catalyst, it is necessary to select an active catalyst, and moreover to adjust such thermal conditions in a reactor which ensure full combustion of ethylene.

It has been found that what is particularly advantageous is application of a platinum catalyst obtained by impregnation of a porous carrier, in particular of active aluminum oxide with specific surface area of about 200 $m^2/g$, with a 0.05-0.5% solution of chloroplatinic acid and subsequent drying and heating at the temperature of 500°-550° C. in a stream of air. The catalyst such prepared is additionally activated by impregnation with a fatty acid, most preferably with oleic acid, at the temperature of 60°-80° C., and slow heating in a stream of nitrogen up to the temperature of 400°-450° C. for 2 hrs. This treatment causes thermal destruction of a fatty acid, as a result of which, beside volatile products, soot is also evolved and deposited on the catalyst surface. In order to remove this solid residue from the catalyst surface, the catalyst is subjected to oxidation at the temperature of 500°-550° C. in the stream of air. The treatment described above causes probably still higher development of the catalyst surface, as said catalyst is characterized by particularly high activity initiating oxidation of ethylene already at 155° C. and ensuring its complete oxidation in the temperature range 250°-350° C.

As it was mentioned above, full combustion of ethylene can be achieved both by application of highly-active catalyst of hydrocarbon combustion and by adjustment of appropriate thermal conditions in the reactor itself. The desired temperature of the reactor is obtained by placing electric heaters which heat the bed to the mean temperature 200°-500° C. in the catalyst bed. Optimal load of internal surface of the electric heating element should be kept at 1-10 WAT/$cm^3$, advantageously 3-5 WAT/$cm^3$. Location of heaters in the catalyst bed should have been considered as undesirable, as in this case local overheating of the bed occurs, which as a rule leads to undesirable perturbations in the catalytic process.

It has been found, however, unexpectedly, that at high dilution of the gas to be burnt (which is the case in spontaneous evolution of ethylene during storage of horticultural products), the spots in which this overheating occurs become the zones of the reaction initiation which affects advantageously conversion degree. Harmlessness of the heating elements placed in the catalyst bed comes probably also from the fact that the process of ethylene combustion is performed at the relatively low bed temperature amounting on the average to 250°–350° C.

The method according to the invention can be effectuated in a simple set-up consisting of cylindrical reactor with a layer of the catalyst bed in which a heater, for example an electric spiral, is located (its voltage being regulated with a transformer). The reactor outlet is connected to a water cooler in which the reaction gases are cooled down to the desired temperature and conveyed further to the storage chamber. The gas is pressed with a blower from this chamber to the reactor closing the gas circuit in this way.

Depending on the size of storage chambers and also on the amount of the stored products (which affects the ethylene concentration), the process of ethylene removal can be conducted continuously or only for several to a dozen or so hours per twenty-four hours. The method according to the invention makes it possible to reduce the ethylene content in the outlet gas from the reactor below 1 ppm.

The method according to the invention has been checked experimentally. The experiments were carried out in two cubic chambers of 1 m$^3$ each in which 100 kg samples of various horticultural products were placed. Both chambers were connected to the catalytic set-up, through which gas mixture from the chambers was circulated: the reactor connected to chamber I was heated above 200° C., which made active operation of the catalyst possible, whereas reactor connected to chamber II was not heated and therefore oxidation of ethylene did not take place. The connecting of the catalytic set-up to chamber II was done to establish identical conditions for gas circulation in both the chambers.

The catalytic set-up consisted of a cylindrical reactor 50 mm in dia., in which a 20 cm high layer of the catalyst was placed. The reactor was heated with an electrical spiral, the voltage of which was controlled with a transformer. The temperature of the catalyst bed was indicated by a thermometer. A water cooler was fitted past the reactor to cool down the reaction gases. Air was pressed through reactor and back to the chamber with the help of a blower. The gas flow rate was regulated with a rotameter.

A platinum catalyst has been used in the experiments, obtained by saturation of active aluminum oxide of specific surface area of about 200 m$^2$/g and in the form of spheres 3 mm in dia. with 1% solution of chloroplatinic acid and subsequent drying and heating at 500° C. The chambers were loaded with mature fruits. Quality of fruits was determined after 5-day storage. Ethylene concentration in the chambers and in gas stream past the catalyst bed was determined gas-chromatographically.

The examples given below illustrate conditions in which the experiments were carried out and show also the effects obtained.

EXAMPLE I

Two chambers I and II were loaded with 100 kg portions of strawberries of the same plantation and of the same crop. The air was circulating through both chambers with the flow rate of 50 l/hr, the only reactor placed in chamber I being heated above 200° C. Temperature in both chambers was kept at 12° C.±1° C. After five days concentration of ethylene in chamber I was 70 ppm and in chamber II 1320 ppm. Ethylene concentration in the gas stream led out of the reactor connected to chamber I was below 1 ppm.

The strawberries in chamber I preserved their freshness in 75%, whereas those in chamber II lost completely commercial value undergoing decomposition.

EXAMPLE II

The experiment was carried out as in Example I, the flow rate of the circulating gases being 200 l/h. After five days the strawberries in chamber I preserved their freshness in 95% whereas the strawberries in chamber II were the same as in Example I.

Ethylene concentration in the chamber was 9 ppm, and in chamber II 1120 ppm. Ethylene concentration in the gas stream directly after the reactor was below 1 ppm.

EXAMPLE III

Chambers I and II were loaded with 100 kg of commercially mature bananas each. The experiment was carried out as in Example II.

After five days of storage bananas in chamber I preserved their freshness in 80%, whereas in chamber II 95% of bananas were rotten.

Ethylene concentration in chamber I was 12 ppm, whereas in chamber II 1250 ppm.

EXAMPLE IV

Chambers I and II were loaded with 100 kg of cherries each. The experiment was carried out as in example II. After five days of storage 98% of cherries in chamber I preserved their freshness, whereas only 25% in chamber II.

Ethylene concentration in chamber I was 7 ppm, and 850 ppm in chamber II. The ethylene concentration in the outlet gas from the acting reactor was below 1 ppm.

EXAMPLE V

Chambers I and II were filled with 100 kg of apples of an early variety and of full maturity each. After 5-day storage all apples in chamber I preserved freshness and 62% of apples in chamber II lost freshness and taste. Ethylene concentration in chamber I was 3 ppm and in chamber II 120 ppm. The ethylene concentration in the outlet gas from the working reactor was below 1 ppm.

EXAMPLE VI

Chambers I and II were filled with 100 kg of tomatoes of full maturity each. The experiment was carried out as in example II. After five days of storage in chamber I 98% of tomatoes preserved their commercial value, whereas in chamber II only 25%. Ethylene concentration in the chamber was 12 ppm and in chamber II 830 ppm. The ethylene concentration in the outlet gas from the working reactor was below 1 ppm.

What is claimed is:

1. A method for storing horticultural products in a fresh state by circulating the atmosphere surrounding said products and by removal of ethylene therefrom outside of the storage chambers, characterized in that ethylene is removed by catalytic combustion in the presence of a platinum catalyst which has been activated by impregnating it with a fatty acid at a temperature of 60°–80° C., slowly heating it in a nitrogen stream to a temperature of 400°–450° C. for a period of two hours, and then in an air stream at a temperature of 500°–550° C.

2. A method as defined in claim 1, characterized by that combustion of ethylene is conducted advantageously in the presence of said platinum catalyst, which is obtained by impregnation of active aluminum oxide having a specific surface area of about 200 $m^2/g$, with a 0.05% solution of chloroplatinic acid followed by drying and heating it in the stream of air at the temperature up to 550° C.

3. A method as defined in claim 1, characterized in that combustion of ethylene is conducted in the presence of a bed of said catalyst, in the bed of which there are placed electric heaters operating at a load of the internal surface of the heaters of 1–10 WAT/$cm^3$.

4. A method as defined in claim 3, characterized in that combustion of ethylene is carried out while maintaining the temperature of the catalyst bed in the range 200°–500° C.

5. A method according to claim 4, characterized in that the temperature of said catalyst bed is in the range of 250°–350° C.

6. A method according to claim 3, characterized in that the load of the internal surface of the heaters is 3–5 WAT/$cm^3$.

7. A method according to claim 1, characterized in that the fatty acid is oleic acid.

* * * * *